E. C. MECHLING.
PLAYER PIANO AND PHONOGRAPH.
APPLICATION FILED OCT. 12, 1915.
1,311,663.
Patented July 29, 1919.
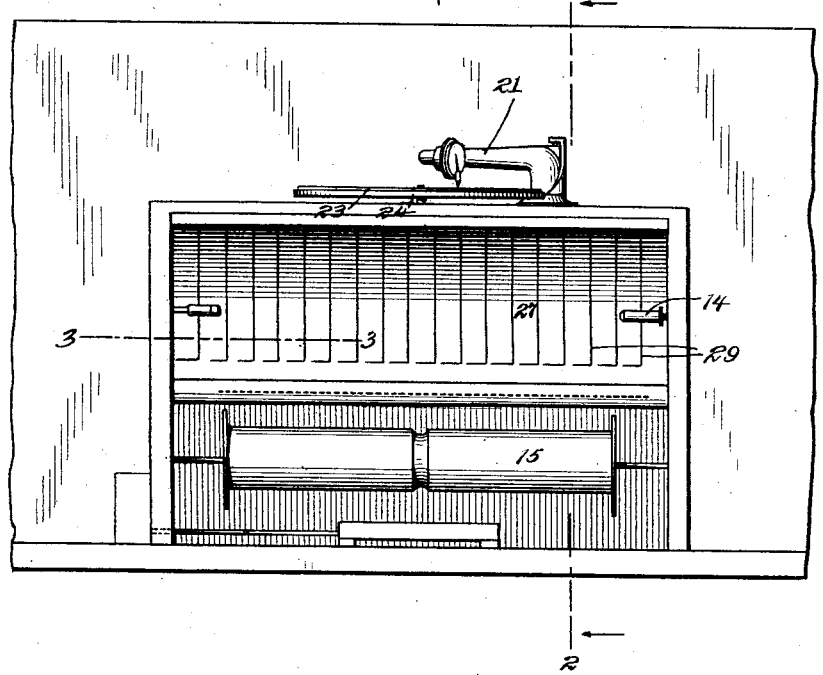
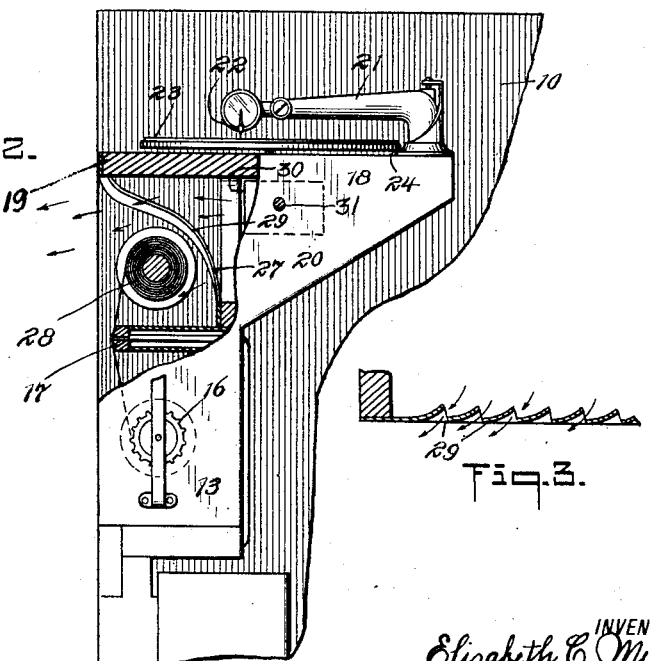
WITNESS
INVENTOR
Elizabeth C. Mechling
BY
Hillary C. Messmer
ATTORNEYS

UNITED STATES PATENT OFFICE.

ELIZABETH C. MECHLING, OF NEW YORK, N. Y., ASSIGNOR TO MELVILLE CLARK PIANO COMPANY, OF CHICAGO, ILLINOIS, A CORPORATION OF ILLINOIS.

PLAYER-PIANO AND PHONOGRAPH.

1,311,663.      Specification of Letters Patent.      Patented July 29, 1919.

Application filed October 12, 1915. Serial No. 55,549.

*To all whom it may concern:*

Be it known that I, ELIZABETH C. MECHLING, a citizen of the United States, and resident of New York city, in the county of Bronx and State of New York, have invented certain new and useful Improvements in Player-Pianos and Phonographs, of which the following is a specification.

The invention relates to a combined player piano and phonograph of the type in which either of these sound producing instrumentalities may be actuated separately or simultaneously.

One of the objects of the invention is to provide in a conventional form of player piano a simple form of spool box which can be utilized not only as a spool box but as a phonograph casing.

Another object of the invention is to provide a phonograph as a complete article of manufacture designed to be assembled with player piano spool boxes as an attachment thereto and the invention further contemplates an arrangement whereby the horn element of the phonograph utilizes the opening in the spool box as its sound discharge port through the front of the piano casing.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 1 is a view in front elevation showing a portion of a player piano provided with a preferred embodiment of my invention attached to the spool box element thereof;

Fig. 2 is a vertical transverse sectional view taken on the line 2—2 of Fig. 1 looking in the direction of the arrow; and Fig. 3 is a horizontal sectional view showing the form of shutter opening from the phonograph horn and taken on the line 3—3 of Fig. 1.

In the drawings, there is shown a portion of a conventional form of player piano casing 10, including a top 12. There is also shown a conventional form of rectangular spool box 13 provided with roll supporting bearings 14, take-up spool 15 and actuating mechanism indicated diagrammatically by the gear 16, all as is usual in well known forms of instruments of this character.

The spool box is modified over well known forms of these devices by omitting the upper portion of the rear wall above the tracker bar 17 and by omitting the top of the spool box.

A phonograph indicated generally by the reference character 18 is positioned on top of the spool box as thus modified. This phonograph is formed of conventional parts and includes a supporting base 19 the front portion of which constitutes a substitute for the removed top of the spool box. The portion of the phonograph positioned to the rear of the spool box is of a box form 20 and coacts with the upper rear portion of the spool box to constitute a horn for receiving sounds from the tone arm 21 positioned on top of the base 19. The tone arm carries the usual sound box 22 designed to be disposed in operative playing position with reference to a playing disk 23 mounted upon a turn-table 24. This turn-table is positioned on top of the base 19 and is accessible from the front of the piano.

The front wall 27 of the phonograph horn is positioned back of the spool actuating mechanism and constitutes the back wall of the upper portion of the spool box. This wall 27 is curved downwardly and rearwardly with a concaved curve to fit about the roll spool 28 carried by the bearing 14. In order to provide a shutter form to this wall 27 the same is slitted vertically as shown in Fig. 1 with the slotted portion bent rearwardly to form inclined openings 29 designed to permit sound to pass from the horn.

The usual motor for rotating the turntable is indicated by the rectangle delineated at 30, and the winding shaft shown in section at 31; from which it may be understood that said motor is located within the rear one of two chambers which are contained in the total unitary structure which results from applying the phonograph base 19 as the top of the original or usual roll box, and the phonograph horn with its apertured front end 29 as the back of the roll box. In this resulting structure the forward one of said two chambers constitutes the roll box proper, and the rear chamber, being, as stated, the phonograph horn, accommodates the phonograph motor, as described.

By means of this device it is possible to cause the phonograph sounds to issue from the piano casing without providing any opening therefor in addition to the usual spool box opening.

The phonograph element may be sold as a separate article of manufacture and installed on the usual spool box simply by removing the top and upper portion of the back and this can be done without otherwise affecting the player piano.

As the phonograph sound outlet into the piano spool box is of shutter form, the phonograph actuating mechanism is hid from view and at the same time the sound is free to pass from the horn as is usual with phonographs now in general use.

I claim—

1. The combination of a player piano comprising a case having a recess opening at the front of the case and inclosed from the remainder of the cavity of the case; a tracker bar and note sheet mounted in such recess; a phonograph mechanism mounted within the piano case and comprising a sound conduit, said sound conduit leading to and opening through the back part of said recess into the same.

2. The combination of a player piano comprising a casing having an opening in its front wall above the keyboard, a phonograph comprising a sound conduit and amplifier leading to said opening and constituting a recess inclosed from the remainder of the cavity of the piano case, and a tracker bar and note-sheet-propelling means mounted in recess.

3. In combination with a player piano comprising a case including a note sheet compartment opening through the front wall of the case above the keyboard, a tracker bar and note-sheet-propelling means, the tracker bar horizontally disposed in said compartment and comprising a partition dividing it into two chambers, a phonograph mechanism within the piano case and comprising a sound-amplifier opening into the back part of one of said chambers.

4. In a combined player piano and phonograph, the combination of a spool box, a phonograph mechanism provided with a horn opening into said spool box.

5. In a combined player piano and phonograph, the combination of a piano casing, a structure for supporting within said casing the tracker and spools of the player mechanism, said structure comprising a forwardly open front chamber containing the tracker and spools, and a rear chamber constituting the phonograph horn, and an apertured partition between said two chambers.

6. In the structure defined in claim 5 foregoing, the partition between said two chambers having its apertures consisting of up-and-down-extending slits.

7. In the structure defined in claim 5 foregoing, the partition between said chambers having its apertures consisting of slits of which one marginal lip is deflected out of the plane of the general direction of said partition.

8. In the structure defined in claim 5 foregoing, the partition between the two chambers being in general direction inclined so as to face forwardly and downwardly.

9. In the structure defined in claim 5 foregoing, the partition between the two chambers being in general inclined so as to face forwardly and downwardly, and having its apertures consisting of a multiplicity of relatively narrow up-and-down-extending slits.

10. In the structure defined in claim 5 foregoing, the motor for the phonograph record carrier being located in the rear one of said two chambers.

11. In a combined player piano and phonograph, the combination with a spool box structure having an open back, of a phonograph constituting an attachment to the spool box structure and provided with a horn opening through said open back.

ELIZABETH C. MECHLING.

Witnesses:
WILLIAM H. KIRCHNER,
JACOB J. ROSENTHAL.

Copies of this patent may be obtained for five cents each, by addressing the "Commissioner of Patents, Washington, D. C."